(12) United States Patent
Wang et al.

(10) Patent No.: US 10,268,449 B1
(45) Date of Patent: Apr. 23, 2019

(54) NATURAL ORDER IN API CALLS

(71) Applicant: EMC IP Holding Company LLC, Hopkinton, MA (US)

(72) Inventors: Chao Wang, Shanghai (CN); Jichao Zhang, Shanghai (CN); James O. Pendergraft, Raleigh, NC (US); Peter Jun Peng, Shanghai (CN); Kenneth Lee, Raleigh, NC (US); Wei Wang, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

(21) Appl. No.: 14/749,818

(22) Filed: Jun. 25, 2015

(51) Int. Cl.
*G06F 7/24* (2006.01)
*G06F 16/28* (2019.01)
(Continued)

(52) U.S. Cl.
CPC .......... *G06F 7/24* (2013.01); *G06F 16/24522* (2019.01); *G06F 16/289* (2019.01); *G06F 16/90348* (2019.01); *G06F 16/9535* (2019.01)

(58) Field of Classification Search
CPC .......... G06F 17/3043; G06F 17/30427; G06F 17/30283; G06F 17/30274;
(Continued)

(56) References Cited

U.S. PATENT DOCUMENTS 5,657,259 A * 8/1997 Davis .................... G06F 17/211
                                                          341/62
5,675,818 A * 10/1997 Kennedy ........... G06F 17/30985
                                                          704/8

(Continued)

FOREIGN PATENT DOCUMENTS

GB           2480486 A   *  11/2011     ............. G08G 1/017

OTHER PUBLICATIONS

PhiLho, Sorting strings by respecting natural order for numbers, Oct. 6, 2012, PhiLho tech Web Log, pp. 1-4.*

(Continued)

*Primary Examiner* — Jay A Morrison
*Assistant Examiner* — Antonio J Caiado
(74) *Attorney, Agent, or Firm* — Muirhead and Saturnelli, LLC

(57) ABSTRACT

Described are techniques for request processing. A request may be received from a requester for first data to be returned to the requester. The request may be in accordance with an application programming interface. The first data may include a plurality of objects each including a value for a first property. The request may include a parameter of the application programming interface indicating to return the plurality of objects sorted in accordance with natural ordering based on the first property of each of the plurality of objects. The natural ordering may be performed as the default ordering. With natural ordering, one or more consecutive digits in a string are treated as a single numeric value rather than individual characters. First processing may be performed to service the request and obtain the first data. A response, including the first data, may be generated in accordance with the first processing.

18 Claims, 9 Drawing Sheets

(51) Int. Cl.
*G06F 16/9535* (2019.01)
*G06F 16/2452* (2019.01)
*G06F 16/903* (2019.01)

(58) Field of Classification Search
CPC ......... G06F 17/30424; G06F 17/30386; G06F 17/30607; G06F 17/30587; G06F 17/30867; G06F 17/30988; G06F 7/24; G06F 17/30887; G06F 17/30569; G06F 17/30985; G06F 17/215; G06F 17/2217; G06F 17/30595; G06F 16/289; G06F 16/28; G06F 16/24522; G06F 16/2452; G06F 16/245; G06F 16/9535; G06F 16/953; G06F 16/93; G06F 16/90348; G06F 16/90335; G06F 16/903; G06F 6/9532; G06K 19/06196; H03M 7/24; H03M 7/30
USPC .......................... 707/722; 706/14, 20, 45–48
See application file for complete search history.

(56) References Cited

U.S. PATENT DOCUMENTS

| | | | | |
|---|---|---|---|---|
| 5,787,432 A * | 7/1998 | LeTourneau | ...... | G06F 17/30569 707/741 |
| 6,643,661 B2 * | 11/2003 | Polizzi | ...... | G06F 16/954 707/709 |
| 7,685,093 B1 * | 3/2010 | Adams | ...... | G06F 16/242 707/999.001 |
| 7,685,109 B1 * | 3/2010 | Ransil | ...... | G06F 17/30336 707/999.003 |
| 9,665,662 B1 * | 5/2017 | Gautam | ...... | G06F 16/26 |
| 2001/0054020 A1 * | 12/2001 | Barth | ...... | G06Q 10/02 705/37 |
| 2002/0091691 A1 * | 7/2002 | Sharp | ...... | G06F 17/3053 |
| 2003/0187925 A1 * | 10/2003 | Inala | ...... | G06F 17/243 709/204 |
| 2005/0114322 A1 * | 5/2005 | Melman | ...... | G06F 16/9535 |
| 2005/0251519 A1 * | 11/2005 | Davis | ...... | G06F 7/02 |
| 2006/0190452 A1 * | 8/2006 | Ellis | ...... | G06F 17/3053 |
| 2006/0294076 A1 * | 12/2006 | Mordvinov | ...... | G06F 17/30433 |
| 2007/0100962 A1 * | 5/2007 | Barth | ...... | G06F 16/9535 709/217 |
| 2007/0156669 A1 * | 7/2007 | Marchisio | ...... | G06F 16/951 |
| 2008/0005110 A1 * | 1/2008 | Tsuda | ...... | G05B 23/0221 |
| 2008/0018507 A1 * | 1/2008 | Maluf | ...... | H03M 7/04 341/55 |
| 2008/0140612 A1 * | 6/2008 | Dettinger | ...... | G06F 17/30389 |
| 2008/0276193 A1 * | 11/2008 | Pettinati | ...... | G06F 3/0489 715/780 |
| 2009/0193020 A1 * | 7/2009 | Kataoka | ...... | G06F 17/30985 |
| 2009/0248733 A1 * | 10/2009 | Sekiguchi | ...... | G06Q 10/06 |
| 2010/0088685 A1 * | 4/2010 | Ahmed | ...... | G06F 8/51 717/140 |
| 2010/0274851 A1 * | 10/2010 | Abernethy, Jr. | ...... | G06F 3/0482 709/204 |
| 2011/0078221 A1 * | 3/2011 | Tschanz | ...... | G06F 17/30961 707/829 |
| 2011/0113054 A1 * | 5/2011 | McLean | ...... | G06F 17/30932 707/769 |
| 2012/0109877 A1 * | 5/2012 | Takeuchi | ...... | G06F 17/30592 707/601 |
| 2012/0158807 A1 * | 6/2012 | Woody | ...... | G06F 17/30371 708/204 |
| 2012/0253791 A1 * | 10/2012 | Heck | ...... | G06F 16/9535 704/9 |
| 2013/0103397 A1 * | 4/2013 | Almaer | ...... | G10L 15/20 704/233 |
| 2013/0124397 A1 * | 5/2013 | Fox | ...... | G06Q 10/10 705/39 |
| 2013/0198171 A1 * | 8/2013 | Shah | ...... | G06F 17/30292 707/722 |
| 2013/0268260 A1 * | 10/2013 | Lundberg | ...... | G06F 17/28 704/8 |
| 2015/0032830 A1 * | 1/2015 | Liu | ...... | H04L 51/12 709/206 |
| 2015/0135300 A1 * | 5/2015 | Ford | ...... | G06F 16/93 726/11 |
| 2015/0310104 A1 * | 10/2015 | Marchisio | ...... | G06F 16/951 707/722 |
| 2016/0140123 A1 * | 5/2016 | Chang | ...... | G06F 16/24522 707/760 |
| 2016/0140185 A1 * | 5/2016 | Peterson | ...... | H04L 51/24 707/722 |
| 2017/0103070 A1 * | 4/2017 | He | ...... | G06F 16/24522 |

OTHER PUBLICATIONS

Stuart Cheshire, Natural Order Numerical Sorting, Jun. 1997, http://www.naturalordersort.org, pp. 1-2.*

Dimitre et al., sorting filenames numerically when they have non-numeric prefix [duplicate], Unix & Linux Stack Exchange, Jul. 19, 2011, pp. 1-2.*

Coding Horror programming and human factors, "Sorting for Humans: Natural Sort Order," Dec. 12, 2007, 7pps, http://blog.codinghorror.com/sorting-for-humans-natural-sort-order/.

* cited by examiner

```
{
  "entryCount": 25,      ← 408
  "entries":
  [
    { "content": { "id": "dpe_disk_0" } },      ← 410a
    { "content": { "id": "dpe_disk_1" } },      ← 410b
    { "content": { "id": "dpe_disk_2" } },      ← 410c
    ...
    { "content": { "id": "dpe_disk_10" } },     ← 410m
    ...
    { "content": { "id": "dpe_disk_20" } },     ← 410n
  ]
}
```

| Standard or Alphabetic Order | Natural Order |
|---|---|
| dpe_disk_0 | dpe_disk_0 |
| dpe_disk_1 | dpe_disk_1 |
| dpe_disk_10 | dpe_disk_2 |
| dpe_disk_11 | dpe_disk_3 |
| dpe_disk_12 | dpe_disk_4 |
| dpe_disk_13 | dpe_disk_5 |
| dpe_disk_14 | dpe_disk_6 |
| dpe_disk_15 | dpe_disk_7 |
| dpe_disk_16 | dpe_disk_8 |
| dpe_disk_17 | dpe_disk_9 |
| dpe_disk_18 | dpe_disk_10 |
| dpe_disk_19 | dpe_disk_11 |
| dpe_disk_2 | dpe_disk_12 |
| dpe_disk_20 | dpe_disk_13 |
| dpe_disk_21 | dpe_disk_14 |
| dpe_disk_22 | dpe_disk_15 |
| dpe_disk_23 | dpe_disk_16 |
| dpe_disk_24 | dpe_disk_17 |
| dpe_disk_3 | dpe_disk_18 |
| dpe_disk_4 | dpe_disk_19 |
| dpe_disk_5 | dpe_disk_20 |
| dpe_disk_6 | dpe_disk_21 |
| dpe_disk_7 | dpe_disk_22 |
| dpe_disk_8 | dpe_disk_23 |
| dpe_disk_9 | dpe_disk_24 |

FIG. 4B

NATURAL ORDER IN API CALLS

BACKGROUND

Technical Field

This application generally relates to application programming interfaces (APIs).

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of request processing comprising: receiving, from a requester, a request for first data to be returned to the requester, wherein said request is in accordance with an application programming interface, said first data including a plurality of objects each including a value for a first property, wherein the request includes a parameter of the application programming interface indicating to return the plurality of objects sorted in accordance with natural ordering based on the first property of each of the plurality of objects; performing first processing to service the request and obtain the first data; and generating, in accordance with the first processing, a response to the request, said response including the first data. The requester may be a client and said first processing and said generating may be performed by a server that receives the request from the requester. The server may be a data storage system, the client may perform data storage system management, and the request may be a request to retrieve the first data including the object which represents an entity in the data storage system. The first data may include data storage system configuration information stored in a database. The first processing may include transforming the request into a database query; executing the database query with respect to the database; and receiving, from the database, query results including the first data. Transforming may include forming a select statement. The request may include sorting criteria and transforming may include a clause in the select statement specifying the sorting criteria. The method may include returning, by the server, the response to the client. The first property may be a string data type and the method may include sorting the plurality of objects in accordance with the natural ordering of the first property of each of the plurality of objects, wherein said sorting includes treating every series of digits of a string as a single numeric value. Sorting may be performed by one or more code modules of the database. The parameter may indicate to perform sorting of the plurality of objects and wherein the natural ordering is performed as a default sorting order.

In accordance with another aspect of the invention is a system comprising: a data storage system; and a computer system comprising a memory including code of a data storage system management application, wherein the data storage system is a server and the data storage system management application is a client; and said data storage system further comprises a second memory including code thereon that, when executed, performs a method of request processing comprising: receiving, at the data storage system from the data storage system management application, a request for first data to be returned to the data storage system management application, said first data including a plurality of objects each including a value for a first property, wherein the request includes a parameter of the application programming interface indicating to return the plurality of objects sorted in accordance with natural ordering based on the first property of each of the plurality of objects; performing first processing at the data storage system to service the request and obtain the first data; and generating, at the data storage system in accordance with the first processing, a response to the request, said response including the first data.

In accordance with another aspect of the invention is a computer readable medium comprising code stored thereon that, when executed, performs a method of request processing comprising: receiving, from a requester, a request for first data to be returned to the requester, wherein said request is in accordance with an application programming interface, said first data including a plurality of objects each including a value for a first property, wherein the request includes a parameter of the application programming interface indicating to return the plurality of objects sorted in accordance with natural ordering based on the first property of each of the plurality of objects; performing first processing to service the request and obtain the first data; and generating, in accordance with the first processing, a response to the request, said response including the first data. The requester may be a client and said first processing and said generating are performed by a server that receives the request from the requester. The server may be a data storage system, the client may perform data storage system management, and the request may be a request to retrieve the first data including the object which represents an entity in the data storage system, said first data including data storage system configuration information stored in a database. The first processing may include transforming the request into a database query; executing the database query with respect to the database; and receiving, from the database, query results including the first data. The transforming may include forming a select statement. The request may include sorting criteria and the transforming includes a clause in the select statement specifying the sorting criteria. The first property may be a string data type and the method may include sorting the plurality of objects in accordance with the natural ordering of the first property of each of the plurality of objects, wherein said sorting includes treating every series of digits of a string as a single numeric value. Sorting may be performed by one or more code modules of the database. The parameter may indicate to perform sorting of the plurality of objects wherein the natural ordering is performed as a default sorting order.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of information that may be included in a response that may be used in an embodiment in accordance with techniques herein;

FIG. 4B is an example illustrating different sorting or ordering techniques that may be supported in an embodiment in accordance with techniques herein.

DETAILED DESCRIPTION OF EMBODIMENT(S)

Figure 1:
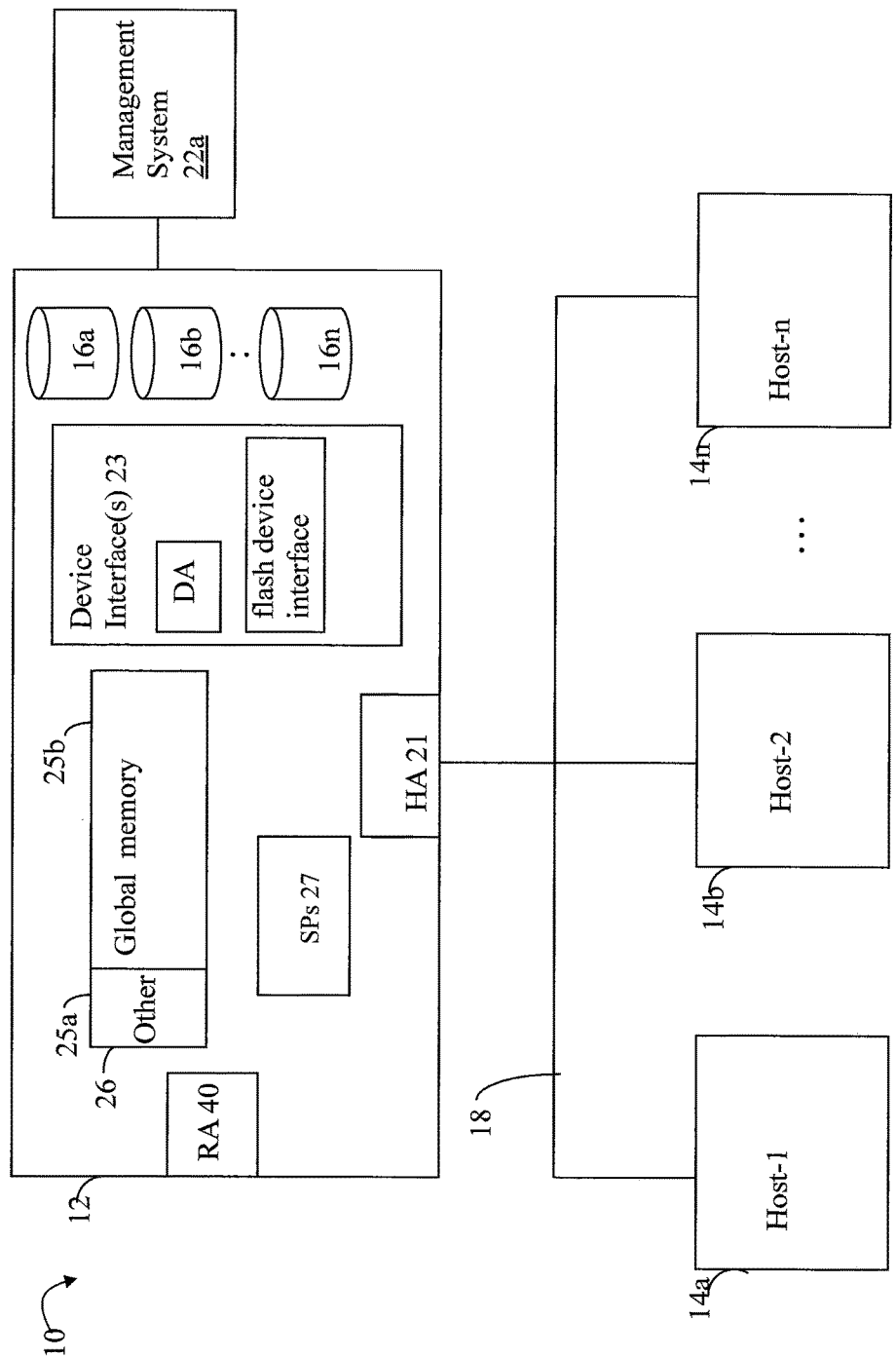
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Management software may be used in connection with management of data storage systems. The management software, as well as more generally any software, may obtain inputs used in connection with performing an operation or task. The management software may be characterized as a client which issues requests to a server, such as a data storage system, in connection with performing requested operations. In one embodiment, the data storage system management software, as a client, may execute on a computer system which communicates with the data storage system that services data storage system management requests from the client. The data storage system management software included in the management system 22a may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives, and the like. During operation of the data storage system management application, its GUI may issue a command request such as in the form of an API call to the data storage system to service the command request. In response to receiving the request, the data storage system may perform processing to service the request and return a response such as, for example, including any requested data storage system configuration information.

As described in more detail in following paragraphs, the command request issued by the GUI may be, for example, to view information regarding logical and/or physical data storage system entities of the data storage configuration (e.g., list physical storage devices and associated properties and statuses, list logical storage entities such as logical devices having storage provisioned on physical storage devices, list properties of such logical devices), perform an operation (e.g., create, delete, modify) with respect to a logical storage entity (e.g., logical storage device, storage group of one or more logical storage devices)) of the configuration, and the like. The data storage system may include, or otherwise have access to, a data base, or more generally any suitable data container or data store, comprising the data storage system configuration information. The data storage system configuration information may describe the current configuration of the data storage system. The data storage system configuration information may include an object model representation of the different physical and logical entities in the data storage system. For example, the configuration information may include objects representing current configuration and state of physical entities such as physical storage devices (e.g., disks, solid state storage devices), power supplies, and the like. The configuration information may also include objects representing current configuration and state of logical entities such as RAID groups and/or storage pools (e.g., configured logical groupings of physical storage devices), LUNs having physical storage configured from such RAID groups and/or storage pools, storage groups (e.g., logical groupings of one or more LUNs), and the like.

In this manner, the data storage system as a server may service a request from the GUI of the data storage system management software such as by retrieving requested data from the data storage system configuration information data base in connection with a request to get or read configuration information. Servicing performed by the data storage system may also include creating, updating and/or otherwise generally modifying the data storage system configuration information database in connection with a request, for example, to provision storage for a new LUN, create a new storage group, add new physical storage devices to the system and therefore create corresponding new objects in the database, and the like. In one embodiment, the data storage system configuration information database may include multiple tables of different types of objects. Each object may include one or more properties characterizing and describing the physical or logical entity represented by the object. Further examples and additional details regarding objects, properties, the database, client requests and server responses are set forth in following paragraphs.

In one embodiment, requests (sent from the client to the server) and responses (returned from the server to the client in response to a received request) may be in accordance with a RESTful management web API. Additionally, in an example of an embodiment in accordance with techniques herein using a RESTful management API, requests and responses may be transmitted in accordance with HTTP (Hypertext Transfer Protocol) where each resource, such as an object, may be identified using a uniform resource locator (URL).

Generally, as known in the art, a REST (Representational state transfer) API or RESTful API, may be characterized as having characteristics described in following paragraphs.

A REST API follows and provides a client-server model. A uniform interface separates clients from servers. This separation of concerns means that, for example, clients are not concerned with data storage, which remains internal to each server, so that the portability of client code is improved. Servers are not concerned with the user interface or user state, so that servers can be simpler and more scalable.

A REST API is stateless in that the client-server communication is further constrained by no client context being stored on the server between requests. Each request from any client contains all the information necessary to service the request, and session state is held in the client. In other words, the necessary state to handle the request is contained within the request itself, whether as part of the URI, query-string parameters, body, or headers. The URI uniquely identifies the resource and the body contains the state (or state change) of that resource. Then after the server does performs its processing of the request, the appropriate state, or the piece(s) of state that matter, are communicated back to the client via headers, status and response body.

Consider, for example, the concept of a session which may maintain state or context across multiple HTTP requests. In REST, the client includes all information for the server to fulfill the request in the request message, resending state as necessary if that state must span multiple requests. Statelessness enables greater scalability since the server does not have to maintain, update or communicate that session state.

In a REST API, such as may be used on the web or internet, clients can cache responses. Thus, responses either implicitly or explicitly define themselves as cacheable, or not, to prevent clients from reusing stale or inappropriate data in response to further requests. Well-managed caching partially or completely eliminates some client-server interactions, further improving scalability and performance.

A REST API may be used to provide a layered system with one or more layers of servers. In such a layered system with the REST API, a client may not typically be able to detect whether it is connected directly to the end server, or to an intermediary along the way. Intermediary servers may improve system scalability by enabling load balancing and by providing shared caches.

A REST API provides a uniform interface that simplifies and decouples the architecture, enabling clients and servers to exist and operate independently. Further characterizations of this uniform interface in a REST API are:

1. Identification of resources. Individual resources are identified in requests. The resources themselves are conceptually separate from the representations that are returned to the client. For example, the server may send data describing an object or resource from its database in the form of an HTML, JSON, or XML description, none of which are the server's internal representation. However the HTML, JSON or XML description as well as the server's internal representation identify and describe the same resource independent of the manner or representation of such information describing the resource.

2. Manipulation of resources through these representations. When a client holds a representation of a resource, the client has sufficient information to modify or delete the resource (provided the client has appropriate permissions to perform such operations).

3. Self-descriptive messages. Each message includes enough information to describe how to process the message. For example, responses may explicitly indicate their cacheability.

4. Hypermedia as the engine of application state (HATEOS). Clients deliver state via body contents, query-string parameters, request headers and the requested URI (the resource name). Services or servers deliver state to clients via body content, response codes, and response headers. This is technically referred-to as hypermedia (or hyperlinks within hypertext). Thus, clients make state transitions only through actions that are dynamically identified within hypermedia specified by the server. When necessary, links may be contained in the returned body (or headers) of a message to supply the URI for retrieval of the object itself or related objects. Generally, the client does not assume that any particular action is available for any particular resources beyond those described in representations previously received from the server. It should be noted that in some implementations considered RESTful, HATEOS may be considered an optional feature or characteristic.

5. As an option, a REST API may optionally provide the feature of code on demand (COD). With COD, servers can temporarily extend or customize the functionality of a client by the transfer of executable code. Examples of this may include compiled components or bodies or code such as, for example, Java applets and client-side scripts, such as JavaScript. "Code on demand" is the only optional feature or characterization of the REST architecture.

Applications and APIs having the foregoing characterization or features may be described as "RESTful". For example. HTTP based RESTful APIs may be defined with these aspects: a base resource identifier (e.g., http://example.com/resources/), an Internet media type for the data (e.g., HTML, XML, and the like), standard HTTP methods (e.g., GET, PUT, POST, or DELETE), hypertext links to reference state, and hypertext links to reference related resources. As noted above, a RESTful API may include at least the above-mentioned characteristics 1-3 and may optionally include characteristics 4 and/or 5. Additionally, a RESTful API may also be characterized as being compliant with the HTML standard.

Features implemented in an embodiment of a RESTful API in accordance with techniques herein may include functionality to query (e.g., read or GET) objects or other data elements such as may be stored in a database. When a client or consumer performs an API call to query objects, the request may further specify one or more parameters describing processing performed on the server side to the query results before returning the processed query results in a response to the request. For example, a request may include a parameter specifying ordering criteria denoting particular sorting or ranking performed on the query results to be returned in response to the request. To further illustrate, such ordering criteria may indicate whether to order the query results in ascending or descending order. Such ordering criteria may also identify one of multiple supported sorting functions or techniques to be applied to the query results. For example, one embodiment in accordance with techniques herein may include functionality referred to herein as a natural order or sorting performed on the query results. Natural ordering may be compared or contrasted with another sorting function or technique referred to herein as standard order or alphabetical ordering. These are described in more detail below with respect to sorting techniques applied to string-based data.

Standard or alphabetical ordering (the standard or alphabetical sorting technique) may be characterized as a technique which orders or sorts string-based data based on a conventional or defined ordering in an alphabet. For example, a defined ordering may be specified in connection with the Roman alphabet uppercase A-Z and lower case a-z), digits (e.g., 0-9), and other characters (e.g., spaces, punctuation, and the like). The particular alphabetical ordering may vary, for example, with the particular alphabet and particular locale of the request since, for example, different locales having different languages may order the same characters or groups of characters differently. For example, one example of a defined ordering (descending order from highest to lowest ranked) for a standard or alphabetical ordering may include ranking letters of the Roman alphabet "A" through "Z" (upper case) and "a" through "z" (lower case) higher than characters of the digits "0" through "9", inclusively. The defined ordering may rank characters that are letters of the Roman alphabet based on respective positions in the alphabet (e.g., A is highest, B is second highest, and so on, with Z as the last in the defined order of the 26 letters of the alphabet). Each single character that is a digit may be based on a descending ordering with "9" as the highest and "0" as the lowest ranked single character digit The defined ordering for the standard or alphabetical sorting may treat the same upper and lower case letter (e.g., "A" and "a") as having the same position in the ordering. With respect to strings including any digits "0" through "9", standard string-based comparisons perform a comparison on a per character basis rather than considering a series of consecutive digits in the string as a single value.

To illustrate, consider 3 strings: "a1a", and "a2a", and "a100a". Standard ordering in ascending order results in the following order: "a100a", "a1a", "a2a" since the ranking or position of digits "0" through "9" are less than the ranking or position for both capital letters "A" through "Z" and lower-case letters "a" through "z". When comparing the 3rd character of each string (e.g., "0", "a" and "a", respectively of "a100a", "a1a", "a2a"), the ranking or position for "0" is less than the ranking or position for "a" and thus results in "a100a" being ranked prior to the remaining 2 strings in ascending standard order. Such results may be unexpected since, from a human's perspective, the string "a100a" includes a numeric value of "100". Such unexpected results may be due to the comparison and ranking performed with respect to each individual digit character in the string rather than considering the series of consecutive digits in the string as a single numeric value of one hundred.

In contrast to the foregoing, natural order sorting when applied to string-based data, treats a series of consecutive digits as a single numeric value when performing comparisons for sorting. The single numeric value used for sorting or comparison purposes with natural order may be the numeric value (e.g., decimal value) of the series of consecutive digits. Thus, natural order sorting may be characterized as an ordering of strings as described in the standard or alphabetical order above with the difference that multi-digit numbers in strings are ordered as a single numeric value. For example, the character string of digits "100" is treated as a single numeric value of one hundred when performing the natural order sorting. Thus, the natural order ascending sort for the foregoing 3 strings is "a1a", "a2a", "a100a", since 1<2<100. Only after the series of consecutive digits in each string is processed as a single unit and compared are any remaining characters examined for subsequent comparisons. With reference to foregoing 3 strings, the first comparison made for the first character of each string compares 3 lower case "a"s. The second comparison made for each string compares decimal values of "1", "2", and "100", resulting in the foregoing ascending natural ordering of the 3 strings. Only after the foregoing second comparison, when the numeric values are equal, are the 3 remaining "a" characters of the 3 strings considered.

The natural order sort (also referred to herein as the natural order sort or sorting technique) as mentioned above and elsewhere herein is useful for strings, such as object properties for disk names or identifiers, that may contain both numeric or digit characters (e.g., any of "0" through "9") as well as non-numeric characters, where any series of characters of digits are treated as a single numeric value.

In one embodiment using a RESTful API in connection with data storage system management, a request may be issued from the client to GET properties of one or more instances of an object such as a DISK object in the object model used for data storage system configuration information. For example, the following is an example of a query or request that may be issued from the client to return a sorted or ordered list of DISK objects:

GET https://10.108.53.81/api/types/disk/instances?orderby=id

The above is an example of a request that may be issued by a client, such as the data storage system management software, to obtain an ordered list of DISK objects based on the "id" or identifier (e.g., in the parameter "orderby=id") that may be used to uniquely denote each DISK object. Each DISK object may be included in an object model definition of a data storage system configuration and may represent an instance of a physical disk or data storage device in the data storage system configuration. In this example, "orderby=id" is included in the request where "orderby" indicates to perform a natural order sort in ascending order based on the object property "id", which is a string or character-based data type (e.g., as opposed to a data type that is numeric such as integer or real).

As described in more detail below, an embodiment in accordance with techniques herein may include a RESTful API with a natural order sorting function denoted by a parameter of the request of API call.

Figure 2:
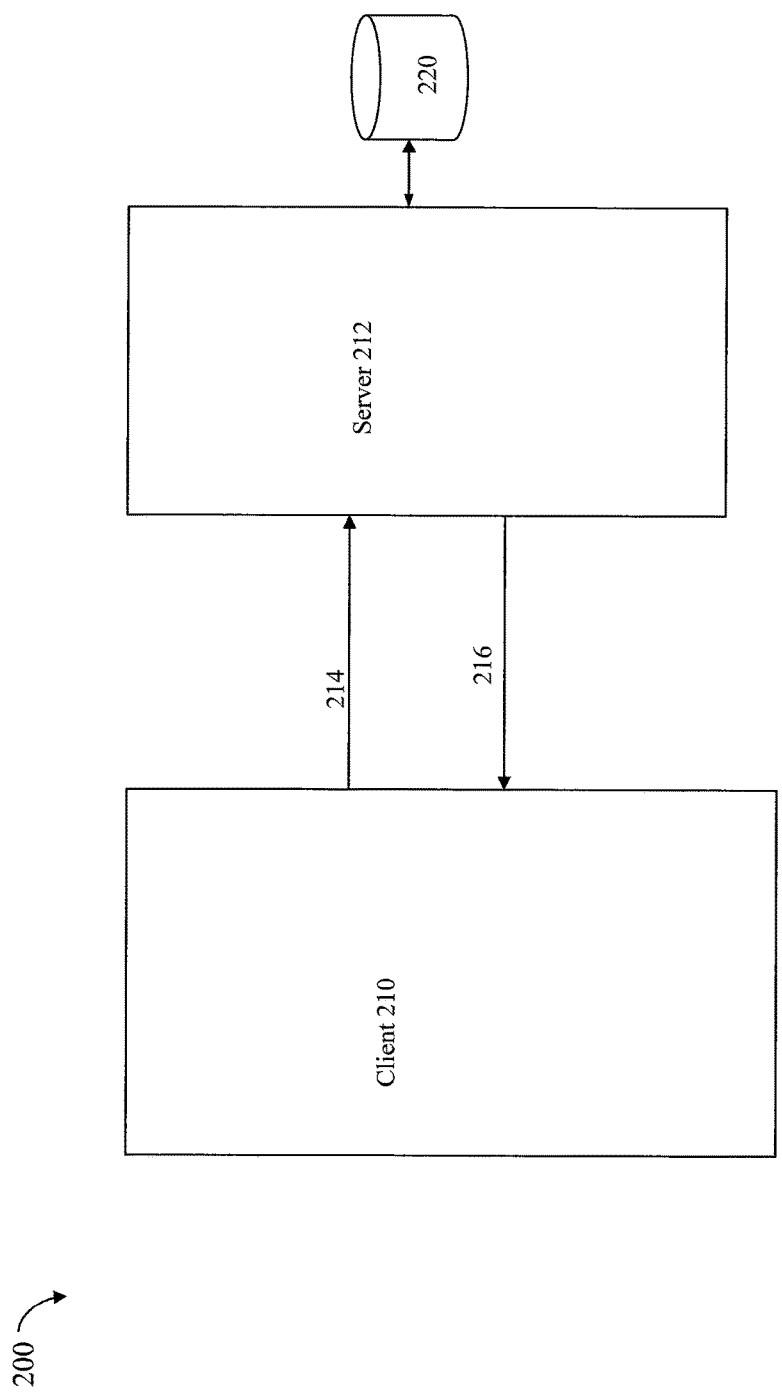
FIG. 2 is an example of a system including a client and server in an embodiment in accordance with techniques herein.

Referring to FIG. 2, shown is an example 200 of a system operating in accordance with techniques herein. The example 200 includes a client 210 and a server 212. In one embodiment in accordance with techniques herein, the client 210 may be a system including data storage system management software, and the server 212 may be a data storage system. In the example embodiment where the server 212 is a data storage system and the client 210 includes data storage system management software issuing the request 214, element 220 may be a data store including data storage configuration information describing the current configuration of the data storage system. The data store 220 may be, for example, a database, or more generally, any suitable data container of the data storage configuration information.

In one embodiment, the data store 220 may be an SQL (Structured Query Language) database such as PostgreSQL (also referred to as "Postgres") which is an object-relational database management system (ORDBMS) with an emphasis on extensibility and on standards-compliance. As a database server, Postgres may be used to store data securely and to allow for retrieval of data at the request of other software applications.

The client 210 may issue a request 214 to the server 212 where the request 214 uses a REST API in accordance with techniques herein. The request 214 may be a request to read or GET data storage configuration information from the data store 220. Examples and further details regarding requests that may be used in an embodiment accordance with techniques herein are described elsewhere herein.

In response to receiving the request 214, the server 212 may perform processing to service the request. Such processing may include retrieving information from the data store 220, performing sorting or ordering as may also be specified in the request. Once the server 212 has completed processing for the request, the server sends a response 216 to the client including the requested information. Examples and further details regarding responses that may be used in an embodiment in accordance with techniques herein are described elsewhere herein.

It should be noted that examples described herein may refer to a client that is an application including a GUI. However, techniques herein may be used more generally in an embodiment with any suitable client including one that does not have a GUI. Additionally, techniques herein may also be illustrated with reference to an embodiment where the client and server are on two different systems and where the server is a data storage system. More generally, the client and server may be any suitable system or component (e.g., server does not have to be a data storage system). Furthermore, the client and server may both operate in the same physical system. For example, as a variation to an embodiments described herein, the client (as the GUI-based data storage management application) may execute on processor of the data storage system itself where client requests are serviced using a database also located on the data storage system or otherwise accessible to the data storage system.

Figure 2B:
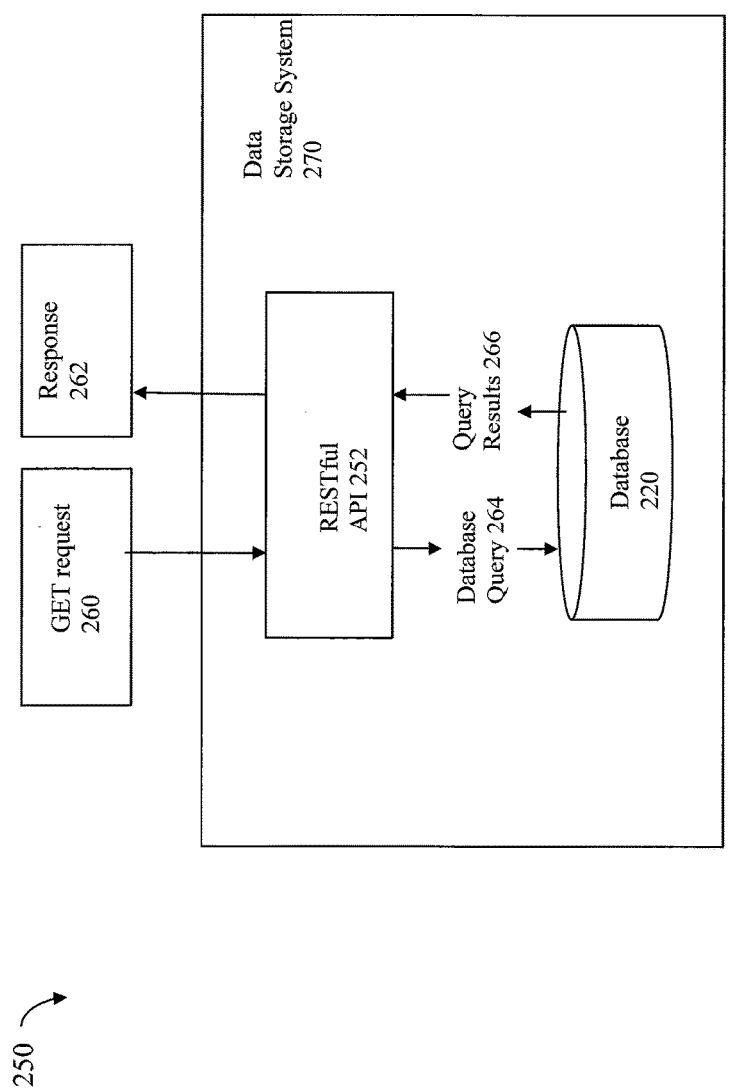
FIG. 2B is an example illustrating in more detail components of a data storage system in an embodiment in accordance with techniques herein.

Referring to FIG. 2B, shown is an example 250 illustrating in more detail workflow and components that may be used in an embodiment in accordance with techniques herein on the server side. In this example, the server 212 may be a data storage system 270 which includes a RESTful API software layer 252 that receives a GET request 260. The GET request 252 may be transformed, as described elsewhere herein, into a database query 264 issued to the database 220 to retrieve the requested information. Query results 266 may be returned from the database 220 to the API 252 which may further perform processing to generate response 262 returned to the client.

Figure 3:
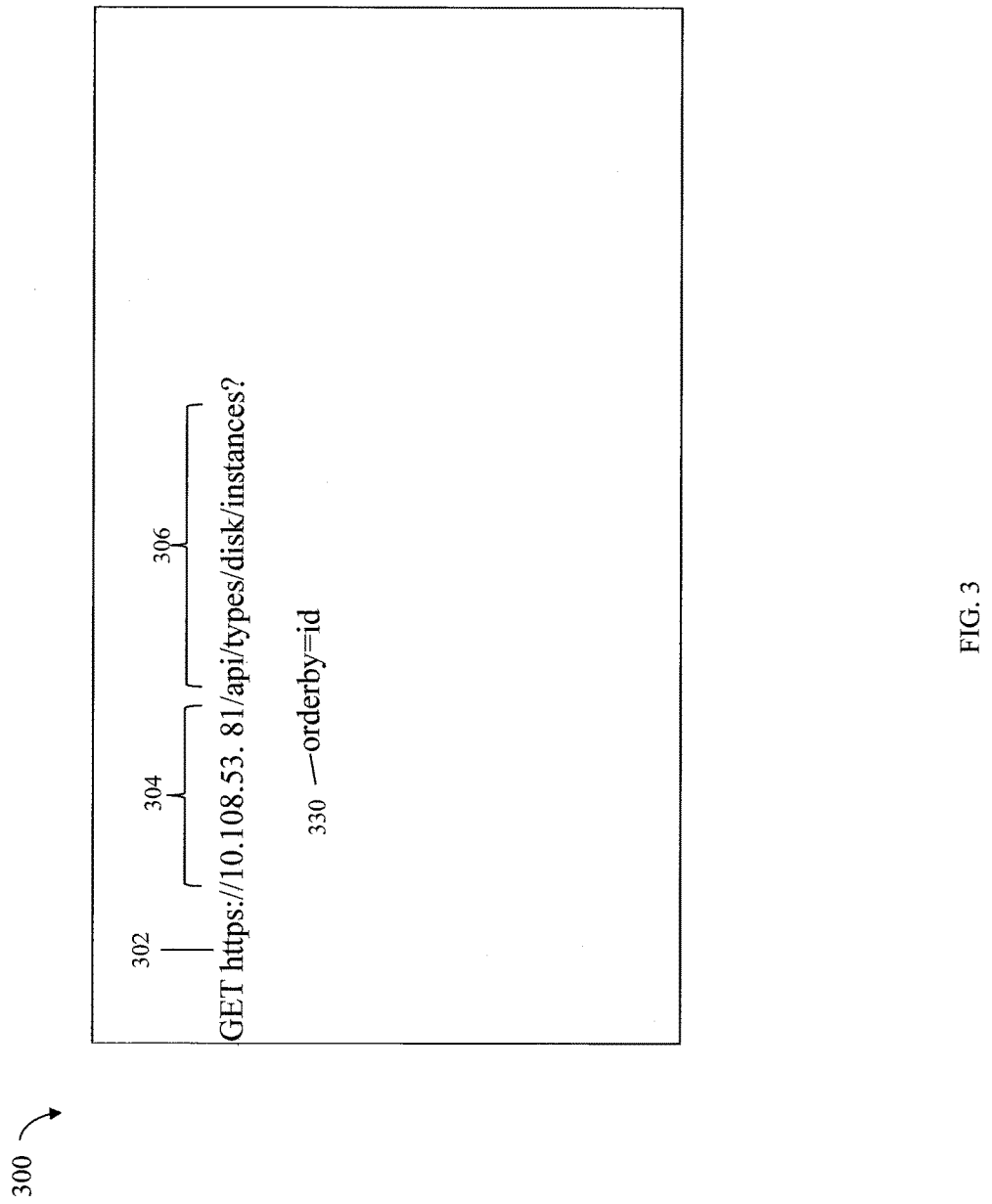
FIG. 3 is an example of a request that may be used in an embodiment in accordance with techniques herein.

Referring to FIG. 3, shown is an example of a URL that may be sent from the client to the server in a GET request in an embodiment using a REST API in accordance with techniques herein. The example URL in FIG. 3 is similar to the example described above but with additional annotation of element numbers described below.

In the example 300, element 302 identifies the protocol used for the request. HTTPS (Hypertext Transfer Protocol Secure) is one example of a protocol used in connection with host or server communications for the resource identified by the URL. As known in the art, HTTPS is a combination of Hypertext Transfer Protocol (HTTP) with the SSL(secure socket layer)/TLS (transport layer security) protocol. It provides encrypted communication and secure identification of a network web server. HTTPS signals the client browser to use an added encryption layer of SSL/TLS in connection with HTTP when communicating with a server such as to retrieve a requested resource over the internet from the server. In connection with HTTPS, processing may be performed which includes server authentication (e.g., such as by the client examining and validating/verifying the server's digital certificate and that the certificate correctly and properly identifies an expected trusted entity associated with the server's website or internet address). Thus, specifying that the server providing the resource(s) (e.g., corresponding to the one or more objects identified by the URL request) use HTTPS is one way of ensuring that the above-mentioned validation or verification of the server's identify is performed.

Element 304 specifies the server location and may be an IP address (e.g., web address) for the server. Alternatively, the location may be specified using names for a domain, subdomain, and the like, such as using an FQDN (fully qualified domain name) corresponding to the illustrated IP address 304. As known in the art, when using domain names, the domain name server (DNS server) then resolves the server name to its IP address through a name resolution process using its DNS tables.

Element 306 identifies the one or more objects, or more generally, one or more resources. In this example, "api/types/disk/instances" specifies syntax identifying all disk objects or instances.

Element 330 comprises the query portion of the URL and may include one or more query parameters. In this example, element 330 specifies a query parameter "orderby=id" whereby the requested disk objects are to be returned in a sorted or ordered list based on the object property or attribute "id". In one embodiment as described herein, specifying use of the orderby query parameter when applied to an object property that is of type string may result in a default natural ordering or sorting of the query results returned to the requester. Additionally, by default, the natural ordering may be in ascending order.

An embodiment in accordance with techniques herein may include support for multiple sorting or ordering techniques. For example, the embodiment may include support for both natural order sorting and standard or alphabetical sorting. Additionally, the embodiment may include support for applying such sorting techniques resulting in either ascending or descending sorted order. Thus, such an embodiment may provide syntax in its API for sorting criteria that allows a user to select whether to apply natural order sorting or standard order sorting, and also whether to rank the sorted results in ascending or descending order. In one embodiment, defaults of natural order sorting and ascending order may be specified for an object property that is a string data type when the API call includes the parameter or function "orderby" denoting to generally sort or rank the query results. In other words, the request does not specifically indicate any further query parameter besides "orderby" to denote whether to apply natural order or standard order sorting technique and also does not include any further query parameter to denote whether to sort the results in ascending or descending order. Thus, an embodiment may assume default values of natural order and ascending order. Such default values assumed may vary with the data type of the object property for which sorting is performed. For example, "id" in the foregoing example may be a string or character-based data type result in defaults of applying the natural ordering technique and ordering results in ascending order. An embodiment may assume different defaults with other data types of the object property for which sorting is performed.

A request may indicate to use options other than the defaults through explicitly specifying the appropriate syntax in the request for such options. For example, in one embodiment, the API may include syntax used to identify ascending or descending order as follows:
&orderby=id asc
to explicitly denote ordering the sorted results in ascending order and
&orderby=id desc
to explicitly denote ordering the sorted results in descending order.

In a similar manner, an embodiment may include syntax for use in the request to specify or select applying the natural order sort or the standard or alphabetical sort. For example, in one embodiment, the API may include syntax as follows:
&orderby=id natural
to explicitly denote applying the natural order sorting technique to obtain the sorted results; and &orderby=id standard to explicitly denote applying the standard or alphabetical order sorting technique to obtain the sorted results.

It should be noted that other embodiments may use other syntax in connection with specifying requests and responses than as specified in FIG. 3 as well as other examples herein.

It should also be noted that the example of FIG. 3 illustrates an example where all disk object instances are sorted by default in accordance with the natural order sorting. An embodiment may include additional options and associated syntax, for example, allow further criteria to specify which disk instances such as ones meeting/matching other criteria.

Thus, the example 300 illustrates a URL request in accordance with a REST API where the client requests a list of all disk objects where the list is sorted in ascending order using the natural order sorting technique. In response to receiving the request 300, the server performs processing to service the request and return the requested information. More specifically, the server may perform processing including retrieving a list of all disk objects from the data store of data storage system configuration information, sorting the list of disk objects in ascending order based on a natural ordering applied to the object property "id", and returning a response to the client including the sorted or ordered list of disk objects in the current data storage system configuration.

Referring to FIG. 4, shown is an example of a response that may be returned by the server for the request 300 of FIG. 3. The example 400 includes a response in accordance with the HTTP protocol or standard and includes the requested ordered list the disk objects of the data storage system configuration information. In this simplified example, there are 25 defined disk objects although an embodiment may practically include any suitable number for the particular data storage system configuration. In this example, element 408 denotes the number of entries or disk objects listed in the request. Element 410 includes the requested list of disk objects. In this example as mentioned above there are 25 disk objects and each of elements 410a, 410b, 410c, 410n and 410m indicates the information returned for a single disk object. For example, element 410a includes the disk id or identifier property of "dpe_disk_0" uniquely identifying the disk object instance from all other disk objects. In a similar manner, each of the remaining illustrative elements 410b, 410c, 410m and 410n also respectively include the disk id or identifier property of "dpe_disk_1", "dpe_disk_2", "dpe_disk_10" and "dpe_disk_20". It should be noted that remaining ones of the 25 disk objects not explicitly illustrated in FIG. 4 may be returned in the response in the naturally ordered ascending list of disk objects of 410. Such remaining disk objects may be included between elements 410c and 410m, between elements 410m and 410n, and after 410n, but have been omitted from FIG. 4 for simplicity of illustration. The disk identifier may be returned for each disk object instance in order to distinguish different disk objects.

Referring to FIG. 4B, shown is an example 450 illustrating in more detail the sorted list of disk ids based on the standard or alphabetical sorting technique and natural order sorting technique as may be used in an embodiment in accordance with techniques herein. The example 450 includes a table with the 25 disk ids for disk objects as described in FIG. 4. Column 462 illustrates a list of the 25 disk object id's where such ids are sorted using the natural order sorting technique. The ordering of the ids in column 462 is a more complete list of all 25 disk object ids described in connection with FIG. 4. Element 410 of FIG. 4 denotes an ordering of the disk objects based on disk ids or identifiers whereby column 462 of FIG. 4B provides a complete list of the sorted order in which such entries may be included in portion 410 of the response.

To contrast the sorted list of column 462, column 460 illustrates another ordering of the 25 disk object id's if such id's are sorted using the standard or alphabetical sorting technique in ascending order.

In one embodiment in accordance with techniques herein, the data storage configuration information may be stored in an SQL database. As known in the art, SQL is a language used to perform operations on the database. Such operations may include retrieving or reading information from the database, updating existing information in the database (e.g. modify or change a value of an object property), deleting existing information from the database (e.g., deleting an object from the database), and/or writing new information to the database (e.g., creating new object in the database). In such an embodiment, the GET URL request may be sent from the client and received at the server where the server then performs processing to transform the request into an SQL statement or, more generally, a database query request to obtain the requested object information from the database.

In particular, with reference to FIG. 5, the GET request 1052 received at the server may include a query parameter "orderby" as described herein to sort order retrieved results based on a natural ordering such as described herein and illustrated in connection with FIG. 3. The request 1052 may be parsed and transformed 1054 into an SQL query 1056 to retrieve requested disk objects of GET request and return them in sorted natural order.

In one embodiment, the received GET request may be parsed and transformed 1054 into a database query request that is an SQL SELECT statement. It should be noted that the SQL SELECT statement and syntax described herein for the database query may be considered a general representation of the database query statements, clauses, operators, and the like, that may be included in a query used to obtain the requested data. The syntax used to actually implement such a query may vary with database, query language, and the like, as may be utilized in an embodiment. Despite any such variations, those skilled in the art will recognize the particular query statements and keywords, operations, conditions and the like, (e.g., SELECT statement and various clauses such as WHERE, ORDER BY, and the like) and associated semantics as known in the art in connection with databases.

Once the SQL query 1056 has been determined, the query 1056 may be executed 1060 with respect to the data storage system configuration database to obtain the query results 1062 used to generate 1070 the response 1072. As described herein, the query results 1062 from the database may be placed in a suitable form for the response returned to the client. In one embodiment, the response may be an HTTP response such as illustrated, for example, in FIG. 4.

Generally, processing of step 1054 (e.g., parsing and transforming the GET request into an SQL query) and step 1070 (e.g., generating the response 1072 from the query results 1062) may be performed in any suitable manner such as, for example, by executing a script, executable code generated using a programming language, and the like, to perform the necessary processing.

In one embodiment in accordance with techniques herein, the GET request may be parsed and transformed in step 1054 into a SELECT statement having the following general format and syntax with various clauses included or omitted depending on the particular GET request.

SELECT columns FROM table
WHERE filtering_criteria
ORDER BY ordering_criteria where
table identifies the particular database table from which data is to be retrieved;
columns identifies one or more columns of the table for which data is be retrieved;
filtering criteria identifies any selection or filtering criteria of the GET request as may be specified, for example, using the "filter=" URL parameter (not illustrated in examples herein but may be used in a GET request); and
ordering criteria identifies any ordering criteria of the GET request as may be specified using the "orderby" URL parameter such as illustrated in FIG. 3.

The WHERE clause identifies the particular filtering criteria that must be met or matched by a table row of the database table in order for the columns of the particular table row to be retrieved by the Select statement query.

The ORDER BY clause specifies the ordering criteria used to sort, rank or order the table rows meeting the filtering criteria of the WHERE clause.

The "columns" of the SELECT statement query may be specified using column aliases with an AS clause. As noted above, "columns" identifies the one or more database table columns to be retrieved. The AS clause may be used to specify alternative new names or column aliases of the result set. For a column COL1 to be retrieved from the database table, the SELECT statement may include a column alias of the form:

COL1 AS Alias1 where
COL1 identifies the database table column name; and
Alias1 identifies the column alias that is the alternative or new name or new name column of the query result set.

Figure 5:
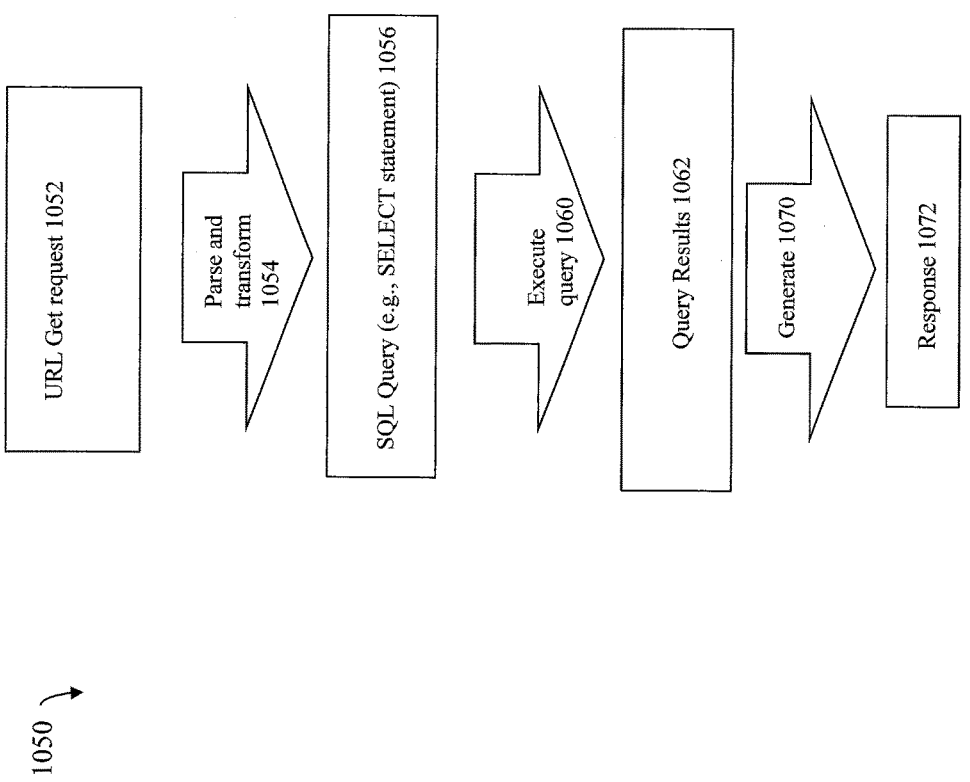
FIGS. 5, 6 and 7 are examples illustrating workflow or processing that may be performed in an embodiment in accordance with techniques herein.
Figure 6:
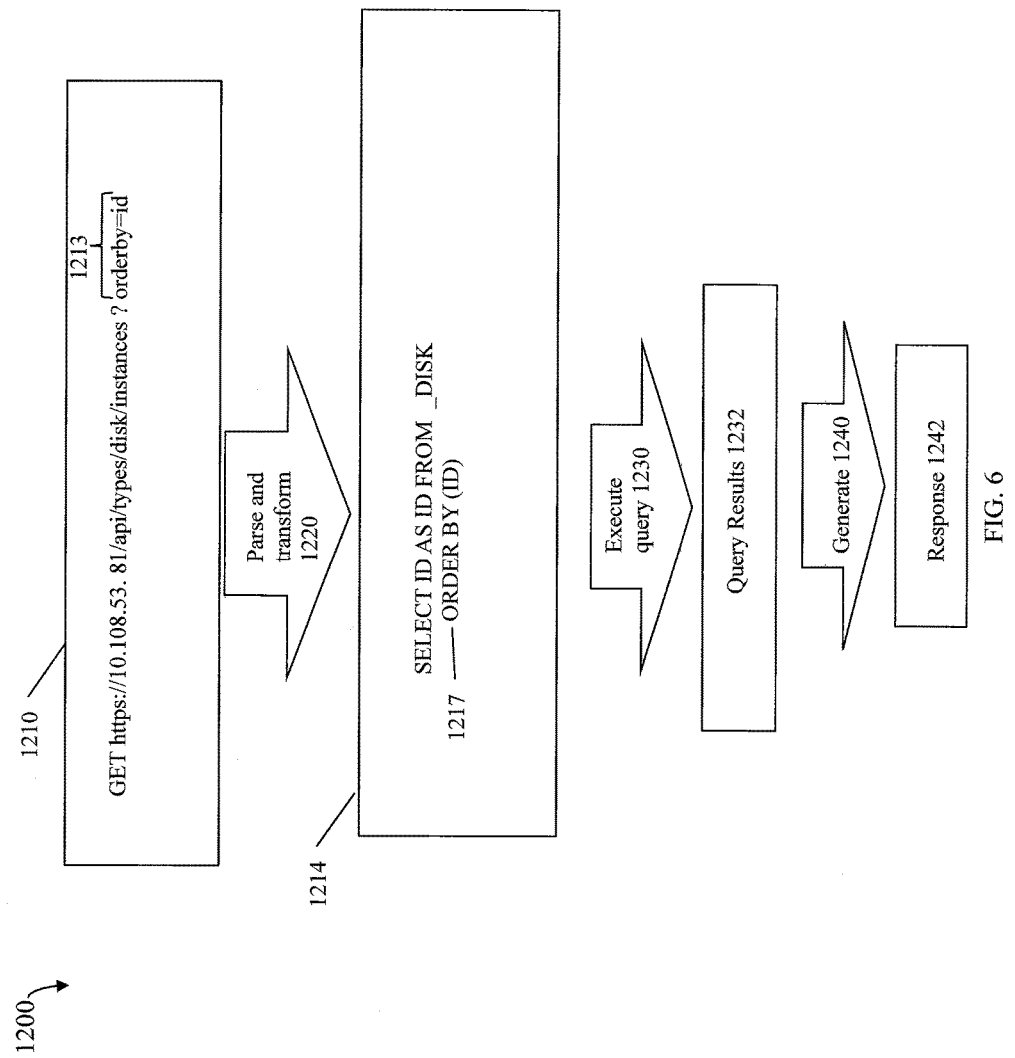

The processing of FIG. 5 may be performed with respect to a GET request, such as the GET request of FIG. 3. For example, with reference to FIG. 6, shown is additional detail regarding processing that may be performed by the server for a GET request 1210 including a URL query parameter for orderby as illustrated in FIG. 3 to apply ordering or sorting criteria to the query results obtained.

As a first step on the server, the request 1210 may be parsed and transformed 1220 into an SQL query 1214 that is SELECT statement 1214 generated from portions of the GET request as described above. Element 1217 denotes the ORDER BY clause corresponding to the sorting or ordering criteria from portion 1213 of the request. In this example, "_DISK" in 1214 identifies a table of the database including the disk objects each including one or more properties or attributes. One such property or attribute of the disk objects is an identifier or ID denoted as "ID" in 1214.

As a second step on the server, the SELECT query statement 1214 may be executed 1230 with respect to the data storage system configuration database to obtain query results 1232 in accordance with the request 1210. In this manner, an embodiment in accordance with techniques herein may have the database calculate and return query results in a sorted natural ascending order by executing the SQL database query 1214.

The query results 1232 may be in the form of a "virtual" table. As will be appreciated by those skilled in the art, the query results table generated as a result of executing the SELECT statement may not be an actual resulting database table stored physically in the database or on persistent physical storage. Rather, the query results table may be virtual or in-memory table including the results of the query.

Returning to FIG. 6, as a third step on the server, the query results 1232, such as the query results table, may be further processed to generate 1240 a response 1242 having a suitable format to be returned to the client. As described herein, in one embodiment, the response 1242 may be an HTTP response including information for each disk object such as illustrated in connection with FIG. 4.

Figure 7:
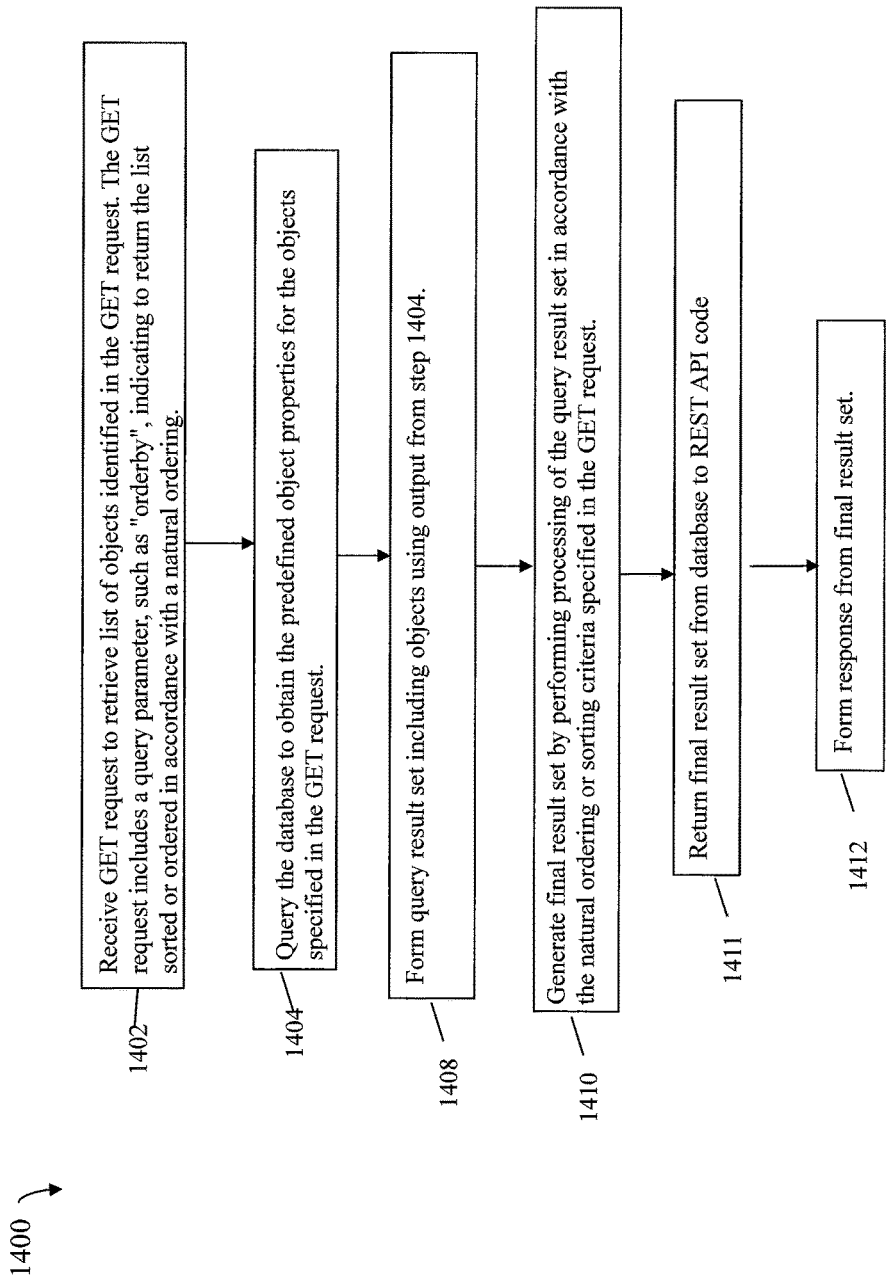

Referring to FIG. 7, shown is a flowchart of processing steps that may be performed in an embodiment in accordance with techniques herein on the server to generate a response for a received request. The steps of 1400 summarize processing as described above.

At step 1402, the GET request is received at the server from the client. The GET request may be as described elsewhere herein, such as in connection with FIG. 3. The GET request may be received, for example, by the REST API code. At step 1404, processing is performed to query and retrieve all predefined object properties for objects specified in the GET request. For example, if the request 1210 is being processed, step 1404 retrieves, from the database for all disk objects, the disk IDs for all disk objects. At step 1408, a query result set including the disk objects and corresponding disk ID for each such disk object. Step 1410 may further process the query result set from step 1408 in accordance with sorting criteria (e.g., orderby parameter) specified in the GET request. In one embodiment as described herein steps 1408 and 1410 processing may be performed by code of the database where the final result set generated by the database is then returned to the REST API code in step 1411. At step 1412, a response, such as an HTTP response as illustrated in FIG. 4, is formed from the final result set of step 1410.

It should be noted that the foregoing describes code of the database performing steps 1408 and 1410. As an alternative, an embodiment may have other code besides code of the database perform step 1410. For example, the database may perform step 1408 and obtain the query result set in any order. Subsequently, other code that may not be included in the database may perform step 1410 to process the query result set in accordance with the natural ordering or sorting criteria of the GET request.

Thus, an embodiment in accordance with techniques herein may perform processing as described where portions of the GET request may be transformed and directly map to corresponding portions of the SELECT statement. Execution of the SELECT statement by the database results in the database software automatically performing processing to implement functionality for any additional clauses such as processing for sorting in accordance with sorting criteria (e.g., due to ORDER BY clause). Thus, for example with reference back to FIG. 2B, one or more code modules of the database 220 may implement functionality for performing the natural order sorting technique as described herein which may sort query results in any of ascending or descending order. Such one or more code modules of the database 220 may also implement functionality in connection with any other supported sorting criteria options, such as the standard or alphabetic sorting technique, ordering query results in ascending order or descending order, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of request processing comprising:
receiving, from a requester and using a processor, a request for first data to be returned to the requester, wherein said request is in accordance with an application programming interface, said first data including a plurality of objects each including a value for a first property, wherein the request is sent by the requester over a network and received by a server, wherein the request includes a uniform resource locator (URL) specifying a plurality of parameters of the application programming interface (API), wherein the plurality of parameters of the API specified in the URL of the request includes a first parameter identifying a protocol used for communications between the server and the requester, a second parameter identifying the first data to be returned to the requester, and a third parameter indicating to return the plurality of objects sorted in accordance with natural ordering based on the first property of each of the plurality of objects;
performing first processing using a processor to service the request and obtain the first data; and
generating, using a processor and in accordance with the first processing, a response to the request, said response including the first data, wherein the first property is a string data type and wherein the method includes:
sorting the plurality of objects using a processor and in accordance with the natural ordering of the first property of each of the plurality of objects, wherein said first property of each of the plurality of objects is a string including numeric and non-numeric characters, wherein the first property of each of the plurality of objects include a sequence of characters comprising a first non-numeric character immediately followed by a one or more consecutive numeric characters immediately followed by another non-numeric character, and said sorting includes:
converting each of the one or more consecutive numeric characters of the first property of each of the plurality of objects to a single numeric value that is a decimal value;
comparing corresponding non-numeric characters of the first property of each of the plurality of objects, said comparing corresponding non-numeric characters including:
comparing the first non-numeric characters of the first property of each of the plurality of objects to one another and determining whether the first non-numeric characters of at least two of the plurality of objects are equal; and
comparing corresponding decimal values of the first property of each of the plurality of objects, said comparing corresponding decimal values comprising:
responsive to determining the first non-numeric characters of the at least two objects are equal, comparing the decimal values of the first property of the at least two objects and ordering the at least two objects in accordance with the natural ordering of the decimal values of the first property of the at least two objects.

2. The method of claim 1, wherein the requester is a client and said first processing and said generating are performed by the server that receives the request from the requester.

3. The method of claim 2, wherein the server is a data storage system, the client performs data storage system management, and the request is a request to retrieve the first data including the plurality of objects representing entities in the data storage system, said first data including data storage system configuration information stored in a database.

4. The method of claim 2, wherein said first processing includes:
transforming the request into a database query;
executing the database query with respect to the database; and
receiving, from the database, query results including the first data.

5. The method of claim 4, wherein said transforming comprises:
forming a select statement.

6. The method of claim 5, wherein the request includes sorting criteria and said transforming includes a clause in the select statement specifying the sorting criteria.

7. The method of claim 2, further comprising:
returning, by the server, the response to the client.

8. The method of claim 6, wherein said sorting is performed by one or more code modules of the database.

9. The method of claim 1, wherein the third parameter indicates to perform sorting of the plurality of objects and wherein the natural ordering is performed as a default sorting order.

10. A system comprising:
a data storage system; and
a computer system comprising a memory including code of a data storage system management application, wherein the data storage system is a server and the data storage system management application is a client; and
said data storage system further comprises a second memory including code thereon that, when executed, performs a method of request processing comprising:
receiving, at the data storage system from the data storage system management application, a request for first data to be returned to the data storage system management application, said first data including a plurality of objects each including a value for a first property, wherein the request includes a uniform resource locator (URL) specifying a plurality of parameters of the application programming interface (API), wherein the plurality of parameters of the API specified in the URL of the request includes a first parameter identifying a protocol used for communications between the server and the requester, a second parameter identifying the first data to be returned to the requester, and a third parameter indicating to return the plurality of objects sorted in accordance with natural ordering based on the first property of each of the plurality of objects;
performing first processing at the data storage system to service the request and obtain the first data; and
generating, at the data storage system in accordance with the first processing, a response to the request, said response including the first data, wherein the first property is a string data type and wherein the method includes:
sorting the plurality of objects using a processor and in accordance with the natural ordering of the first property of each of the plurality of objects, wherein said first property of each of the plurality of objects is a string including numeric and non-numeric characters, wherein the first property of each of the plurality of objects include a sequence of characters comprising a first non-numeric character immediately followed by a one or more consecutive numeric characters immediately followed by another non-numeric character, and said sorting includes:
converting each of the one or more consecutive numeric characters of the first property of each of the plurality of objects to a single numeric value that is a decimal value;
comparing corresponding non-numeric characters of the first property of each of the plurality of objects, said comparing corresponding non-numeric characters including:
comparing the first non-numeric characters of the first property of each of the plurality of objects to one another and determining whether the first non-numeric characters of at least two of the plurality of objects are equal; and
comparing corresponding decimal values of the first property of each of the plurality of objects, said comparing corresponding decimal values comprising:
responsive to determining the first non-numeric characters of the at least two objects are equal, comparing the decimal values of the first property of the at least two objects and ordering the at least two objects in accordance with the natural ordering of the decimal values of the first property of the at least two objects.

11. A non-transitory computer readable medium comprising code stored thereon that, when executed, performs a method of request processing comprising:
receiving, from a requester and using a processor, a request for first data to be returned to the requester, wherein said request is in accordance with an application programming interface, said first data including a plurality of objects each including a value for a first property, wherein the request is sent by the requester over a network and received by a server, wherein the request includes a uniform resource locator (URL) specifying a plurality of parameters of the application programming interface (API), wherein the plurality of parameters of the API specified in the URL of the request includes a first parameter identifying a protocol used for communications between the server and the requester, a second parameter identifying the first data to be returned to the requester, and a third parameter indicating to return the plurality of objects sorted in accordance with natural ordering based on the first property of each of the plurality of objects;

performing first processing using a processor to service the request and obtain the first data; and generating, using a processor and in accordance with the first processing, a response to the request, said response including the first data, wherein the first property is a string data type and wherein the method includes:

sorting the plurality of objects using a processor and in accordance with the natural ordering of the first property of each of the plurality of objects, wherein said first property of each of the plurality of objects is a string including numeric and non-numeric characters, wherein the first property of each of the plurality of objects include a sequence of characters comprising a first non-numeric character immediately followed by a one or more consecutive numeric characters immediately followed by another non-numeric character, and said sorting includes:

converting each of the one or more consecutive numeric characters of the first property of each of the plurality of objects to a single numeric value that is a decimal value;

comparing corresponding non-numeric characters of the first property of each of the plurality of objects, said comparing corresponding non-numeric characters including:

comparing the first non-numeric characters of the first property of each of the plurality of objects to one another and determining whether the first non-numeric characters of at least two of the plurality of objects are equal; and comparing corresponding decimal values of the first property of each of the plurality of objects, said comparing corresponding decimal values comprising:

responsive to determining the first non-numeric characters of the at least two objects are equal, comparing the decimal values of the first property of the at least two objects and ordering the at least two objects in accordance with the natural ordering of the decimal values of the first property of the at least two objects.

12. The non-transitory computer readable medium of claim 11, wherein the requester is a client and said first processing and said generating are performed by the server that receives the request from the requester.

13. The non-transitory computer readable medium of claim 12, wherein the server is a data storage system, the client performs data storage system management, and the request is a request to retrieve the first data including the plurality of objects representing entities in the data storage system, said first data including data storage system configuration information stored in a database.

14. The non-transitory computer readable medium of claim 12, wherein said first processing includes:

transforming the request into a database query;

executing the database query with respect to the database; and receiving, from the database, query results including the first data.

15. The non-transitory computer readable medium of claim 14, wherein said transforming comprises:

forming a select statement.

16. The non-transitory computer readable medium of claim 15, wherein the request includes sorting criteria and said transforming includes a clause in the select statement specifying the sorting criteria.

17. The non-transitory computer readable medium of claim 16, wherein said sorting is performed by one or more code modules of the database.

18. The non-transitory computer readable medium of claim 11, wherein the third parameter indicates to perform sorting of the plurality of objects and wherein the natural ordering is performed as a default sorting order.

* * * * *